United States Patent
Thrun et al.

(10) Patent No.: US 10,913,547 B1
(45) Date of Patent: Feb. 9, 2021

(54) CHARGING STATION FOR SELF-BALANCING MULTICOPTER

(71) Applicant: Kitty Hawk Corporation, Palo Alto, CA (US)

(72) Inventors: Sebastian Thrun, Los Altos Hills, CA (US); Benjamin Otto Berry, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/836,539

(22) Filed: Mar. 31, 2020

(51) Int. Cl.
| | |
|---|---|
| *B64F 1/00* | (2006.01) |
| *B64F 1/36* | (2017.01) |
| *B64C 29/00* | (2006.01) |
| *B64D 27/24* | (2006.01) |
| *B60L 50/60* | (2019.01) |
| *H02J 7/00* | (2006.01) |
| *B60L 53/16* | (2019.01) |

(52) U.S. Cl.
CPC .............. *B64F 1/362* (2013.01); *B60L 50/60* (2019.02); *B60L 53/16* (2019.02); *B64C 29/0025* (2013.01); *B64D 27/24* (2013.01); *H02J 7/0045* (2013.01); *B60L 2200/10* (2013.01)

(58) Field of Classification Search
CPC ......... B64F 1/362; H02J 7/0045; B60L 50/60; B60L 53/16; B60L 2200/10; B64C 29/0025; B64D 27/24
See application file for complete search history.

(56) References Cited

U.S. PATENT DOCUMENTS

| | | | |
|---|---|---|---|
| 10,308,358 B2 * | 6/2019 | Phan | B64C 39/026 |
| 2012/0298790 A1 | 11/2012 | Bitar | |
| 2013/0206921 A1 | 8/2013 | Paduano | |
| 2016/0311544 A1 * | 10/2016 | Phan | B64F 3/02 |
| 2017/0190443 A1 * | 7/2017 | Fisher | B64C 29/02 |
| 2017/0284371 A1 | 10/2017 | Gamble | |
| 2017/0300051 A1 | 10/2017 | Zhou | |
| 2018/0079482 A1 * | 3/2018 | Ivans | B64C 1/00 |
| 2018/0150072 A1 | 5/2018 | Boss | |
| 2018/0194491 A1 * | 7/2018 | Fisher | B64C 39/024 |
| 2018/0362188 A1 * | 12/2018 | Achtelik | H02J 7/0044 |
| 2019/0308724 A1 * | 10/2019 | Cooper | B64F 1/222 |

OTHER PUBLICATIONS

EVTOL Configuration Comparison (Year: NA).*

* cited by examiner

*Primary Examiner* — Ian Jen
(74) *Attorney, Agent, or Firm* — Van Pelt, Yi & James LLP (57) ABSTRACT

A vertical landing is performed by an electric vertical take-off and landing (eVTOL) vehicle above a charger where the eVTOL vehicle includes a rotor that is configured to rotate during an occupant change state to keep the eVTOL vehicle stationary during the occupant change state. A vertically-oriented male charging port that is part of the eVTOL vehicle and a female charging port that is part of the charger are detachably coupled and a battery in the eVTOL vehicle is charged using the charger while the vertically-oriented male charging port and the female charging port are detachably coupled.

18 Claims, 5 Drawing Sheets

CHARGING STATION FOR SELF-BALANCING MULTICOPTER

BACKGROUND OF THE INVENTION

Impediments to using aircraft as personal transportation in more populated areas are the noise produced and the relatively large footprint required by existing aircraft. New types of aircraft that are relatively quiet with a small footprint are being developed to address this. As such aircraft is developed, new ways of managing and/or maintaining such vehicles would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of charging devices and/or systems to charge electric vertical take-off and landing (eVTOL) vehicles (e.g., in some cases, autonomous vehicles with relatively large rotors and relatively small footprints for use in (e.g., urban) areas with limited takeoff and landing space and strict noise restrictions) are described herein. Before describing various embodiments of the charging systems, it may be helpful to describe some exemplary eVTOL vehicles which are charged by such charging systems. The following figures describe two such exemplary vehicles.

Figure 1:
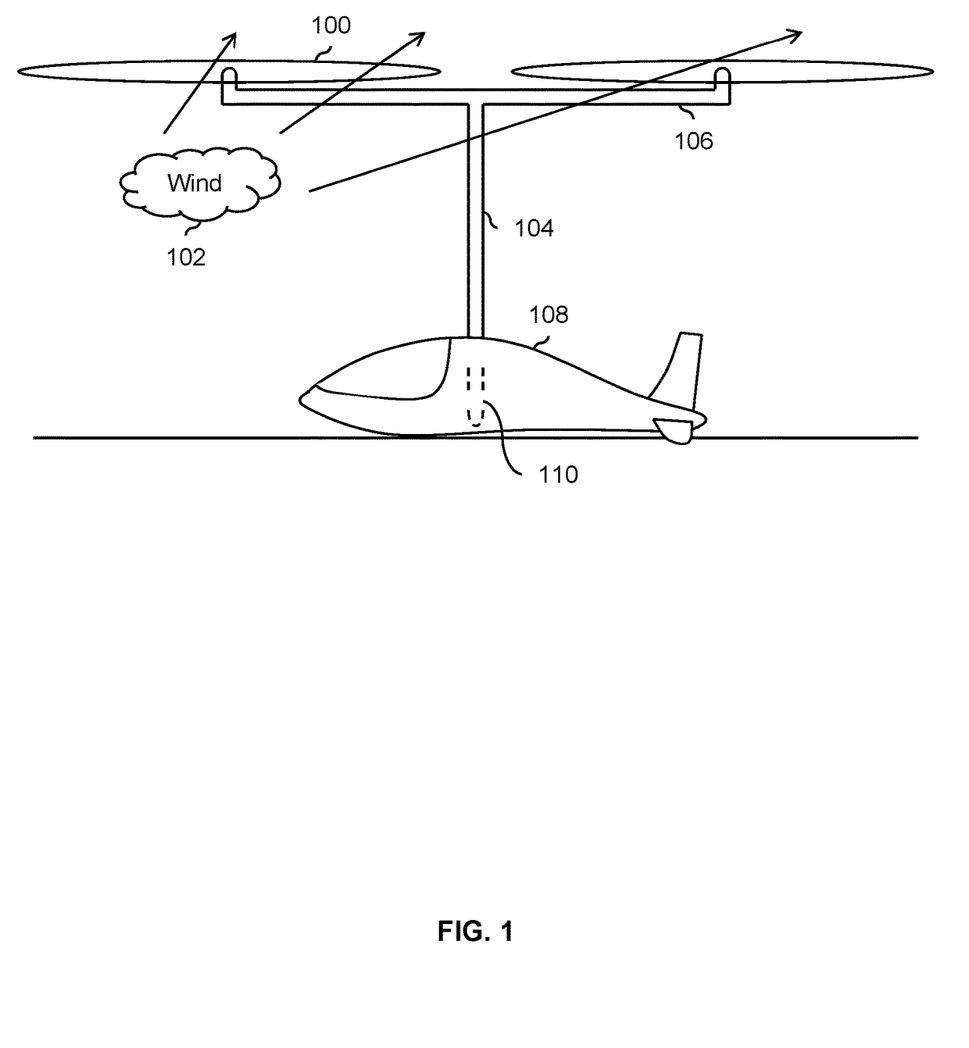
FIG. 1 is a diagram illustrating a first embodiment of a relatively quiet electric vertical take-off and landing (eVTOL) vehicle with relatively long rotor blades.

FIG. 1 is a diagram illustrating a first embodiment of a relatively quiet electric vertical take-off and landing (eVTOL) vehicle with relatively long rotor blades. In this example, the exemplary eVTOL vehicle is a quadcopter with four rotors (100) which rotate about a vertical axis of rotation. To preserve the readability of the drawing, only the front rotor and back rotor are shown in this view. The orientation of the rotors in this quadcopter example permits the vehicle to perform vertical take-offs and landings. This VTOL capability is desirable because it permits the multicopter to land in space-limited locations and/or without a runway (e.g., in a city). To reduce the noise produced by the multicopter, the diameter of the rotors is relatively large (e.g., a diameter of 10 feet or more). This reduces the tip speed of the rotors which in turn reduces the noise produced by the rotors, especially during take-off and landing when the noise is the most noticeable to people on the ground.

In the state shown here, the multicopter is on the ground so that people can get on or get off the vehicle. While on the ground, the wind (102) may blow, causing the large rotors to catch in the wind and act like a sail. To counter this, the rotors stay on while the vehicle is touched down and a controller (e.g., a flight and/or avionics controller) generates one or more control signals (e.g., one for each rotor) to counter any shifts or movement due to the wind blowing on the large rotors. More generally, the shifting that is corrected or otherwise adjusted for may also include noise or errors (e.g., sensor noise, inaccurate models, etc.) in addition to and/or as an alternative to movement due to wind. To put it another way, the controller generates one or more control signals which will cause the rotors to rotate and/or thrust in a manner which causes them to return to a desired, centered, and/or level position (e.g., so that the vehicle is not dragged about as occupants board or disembark).

In this example, a vertical beam or spar (104) is used to elevate the rotors above the heads of any people in the vicinity of the aircraft, including passengers. For example, the vertical beam (104) may be tall enough so that the rotors (100) are above the passenger, and in some embodiments above other common ground obstacles. This may be desirable because it further reduces noise and is safer for people in the vicinity of the vehicle (e.g., the rotors are too high to hit anyone walking by). In some embodiments, the vertical beam (104) is bendable or flexible so that the rotors (100) which are connected to rigid crossbars (106) can move separately from the fuselage (108).

The fuselage shape (108) shown here is merely exemplary and is not intended to be limiting. In some embodiments, the vehicle is a battery powered, autonomously flown vehicle which is used to fly riders from specified pickup locations to specified drop off locations. To improve flight time (and thus, the time between charging), the fuselage may be very different than the example shown here. In some embodiments, the fuselage is an "open air" and/or unenclosed fuselage. For example, there may be a (single) seat for the occupant with safety restraints (e.g., seat belts, a bar which comes down over the occupant's head). Such a "stripped down" fuselage may more closely resemble a ski lift chair or a seat in an amusement park ride rather than a heavier fuselage that completely encloses the occupant. Such an example is described in more detail below. In some other embodiments, the fuselage is enclosed. For example, this may be desirable in applications where the passengers would prefer the comfort and/or protection offered by an enclosed fuselage.

Using such an aircraft to get around congested metropolitan areas is an attractive solution to traffic congestion. In addition to avoiding congested streets, eVTOL aircraft have a relatively small footprint. With an eVTOL aircraft, it is not necessary to have a long runway to perform take-offs and landing. A relatively small area is sufficient to take off and land, which is well suited to congested metropolitan areas. An eVTOL aircraft can (for example) take off and land in parks, parking lots, rooftops, etc. This means that there are many potential take-off and landing spots and the more take-off and landing spots there are, the better coverage there will be for people using the eVTOL aircraft (e.g., their take-off and landing spots near their point of origin and final destination).

One potential obstacle to the deployment of eVTOL aircraft is noise. To address this, eVTOL aircraft need to be quieter than they are now. A major source of noise is the rotors and the amount of noise from the rotors depends primarily upon the tip speed of the rotors. To reduce the tip speed (and thus reduce the amount of noise produced) while still being able to generate sufficient thrust to fly, the example vehicles described herein have relatively long rotor blades (e.g., a diameter of 10 feet or more). This solution of making the rotor blades longer so that tip speed can be reduced is implemented in the exemplary vehicle shown in FIG. 1.

A drawback to using longer rotor blades is that the larger diameter rotors may be more sensitive to wind, essentially acting like a sail. This is especially true when the vehicle is on the ground if the rotors were to stop. Furthermore, in some embodiments, the vehicle is an (ultra)light vehicle which enables the vehicle to fly longer for a given battery capacity, making the example vehicle shown here even more susceptible to wind. To address this, the rotors of the vehicle shown in FIG. 1 keep spinning, even when on the ground to counter the wind and/or (signal) noise as or if needed. A control process continually adjusts the forces and moments (primarily thrust forces) output by the rotors (e.g., so even if the wind shifts the state (e.g., position, rate, etc.) of the rotors relative to a previous state, the rotors return to the previous state (e.g., and the ground position of the passenger compartment is maintained)), as described above.

FIG. 1 is merely one example of an eVTOL vehicle with a small footprint and large rotors (to reduce noise) where the rotors stay on while on the ground and/or while (un)loading occupants. The following figure shows another exemplary vehicle.

Figure 2:
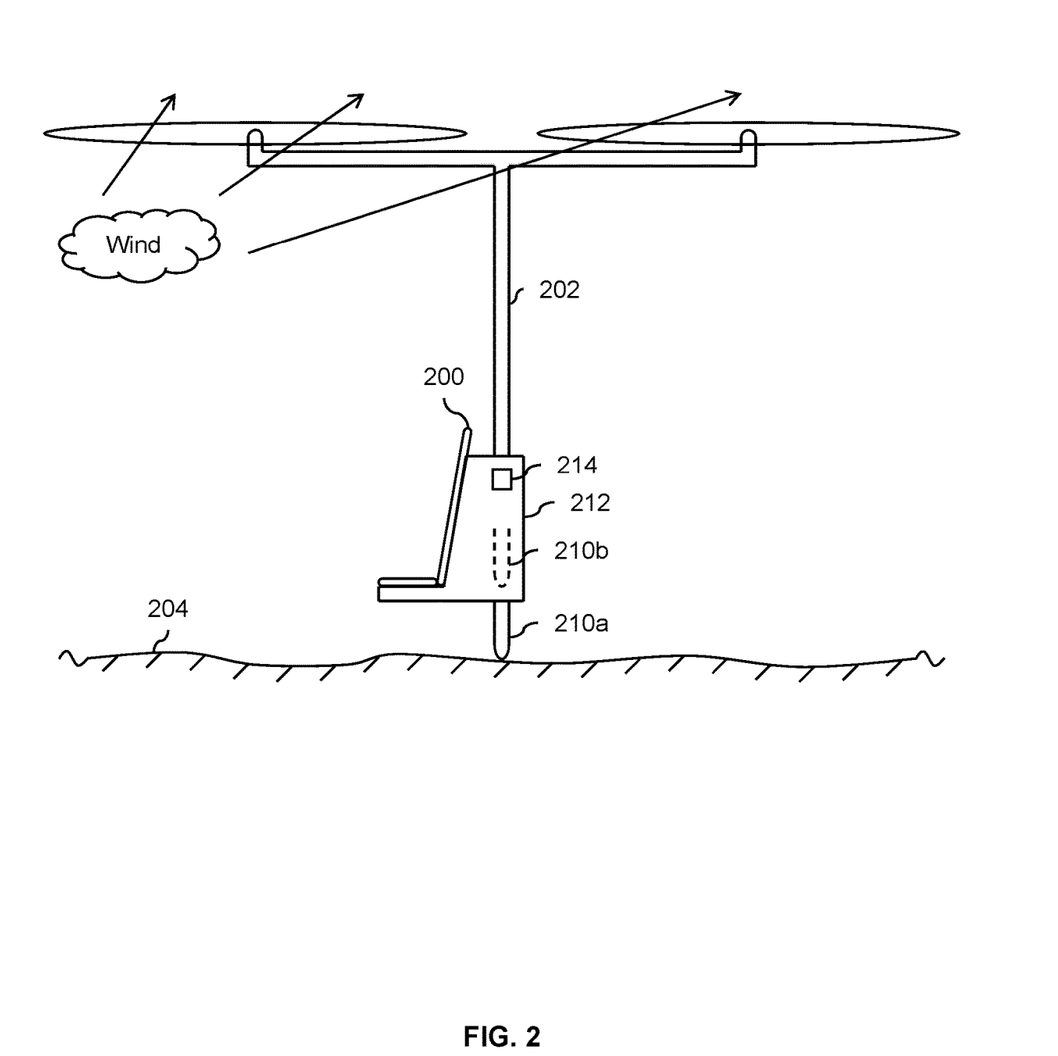
FIG. 2 is a diagram illustrating a second embodiment of a relatively quiet electric vertical take-off and landing (eVTOL) vehicle with relatively long rotor blades with a vertical spar that the vehicle rests upon.

FIG. 2 is a diagram illustrating a second embodiment of a relatively quiet electric vertical take-off and landing (eVTOL) vehicle with relatively long rotor blades with a vertical spar that the vehicle rests upon. In this example, the vehicle is a quadcopter, single seat, and autonomously flown vehicle. As with the previous example, only the front rotor and back rotor are shown in this view to preserve the readability of the drawing. In this example, passengers request a ride and specify a pickup location and drop off location. After the request is granted, a vehicle (e.g., selected from a fleet of vehicles) is sent to pick up the person and take them to the requested destination. To reduce noise (and correspondingly reduce resistance to the service from nearby residents and businesses and/or to comply with local noise ordinances), the blades of the rotors are relatively long.

In this example, to load or unload passengers, the vehicle touches down so that the passenger can get into or out of the vehicle but the only part of the vehicle that touches down is the bottom of the vertical spar (202). Similar to the vehicle shown in FIG. 1, the vertical spar (202), sometimes referred to as a mast, is relatively tall (e.g., so that the rotors are a height of at least 15 or 20 feet) so that the rotors can remain on as passengers board or disembark. Compared to the exemplary vehicle shown in FIG. 1, this vehicle is lighter with an even smaller footprint, making it more attractive in some applications. Another benefit is that since only the bottom of the vertical spar (202) touches the ground (204), this vehicle may be better suited to uneven ground compared to the vehicle shown in FIG. 1 where a larger surface makes contact with the ground and/or there are multiple points of contact with the ground.

To make entering and exiting easier for passengers, in this example, the fuselage includes a seat or chair (200) with no sidewalls. The seat may include a restraint (not shown) to hold the passenger in place, such as a seat belt harness or a bar that comes down over the passenger's head. For example, the seat (200) and an associated restraint may resemble a ski lift chair or an amusement park ride. The elimination of an enclosed fuselage or cockpit reduces the weight significantly. A variety of fuselages, seats, and/or safety features may be employed by the vehicle and the example shown here is merely illustrative and is not intended to be limiting.

As described above, to ensure that the vehicle does not move while passengers are boarding or disembarking (e.g., because it is an (ultra)light, because of the relatively long rotor blades, due to noise and/or wind, etc.), the rotors of the vehicle stay on even while the vehicle is on the ground (e.g., to let on or let off passengers).

Alternatively, in some embodiments, a vehicle hovers above the ground while passengers board or disembark. For example, the portion of the vehicle (210a) shown touching the ground in this example may be a retractable piece (210b) and normally is in a retracted position (e.g., as shown here, retracted into the body of the fuselage when retracted). In such embodiments, that part of the vehicle would be retracted when passengers board or disembark such that the vehicle is hovering above the ground during this time. This is possible because the rotors stay on even while passengers board or disembark, so it is not necessary for the vehicle to be in contact with the ground during this time. As will be described in more detail below, such a retractable part (210b) in some such embodiments is used for and/or is associated with charging and is extended when the vehicle is being charged and/or is coupled to a charging system. Similarly, the vehicle shown in FIG. 1 may have a retractable part (110) that is used for and/or associated with charging.

It is noted that the vehicles shown in FIGS. 1 and 2 are merely exemplary and are not intended to be limiting. For example, although FIGS. 1 and 2 show quadcopter configurations, any number and/or arrangement of rotors may be used. Similarly, any type of cockpit, mast, fuselage, or conveyance for an occupant may be used.

In some applications, the exemplary vehicles described above are part of an autonomous fleet of vehicles that are used to transport passengers within a city or metropolitan area. For example, a person may request a ride. A vehicle allocator may select an eVTOL vehicle from a fleet of vehicles. The selected vehicle flies to the pickup location, where it performs a vertical landing. As described above, the rotors stay on to prevent the vehicle from moving about while picking up the passenger and while the passenger is getting into the vehicle. Once the passenger is safely in the vehicle, the vehicle performs a vertical takeoff and flies to a drop off location. The vehicle then performs a vertical landing, keeping the rotors on while the passenger disembarks so that the vehicle does not move about.

Periodically, the eVTOL vehicle's battery system will be recharged. The following figures describe various embodiments of charging systems (referred to herein as chargers for convenience) which may be used to charge the exemplary eVTOL vehicles described above.

Figure 3A:
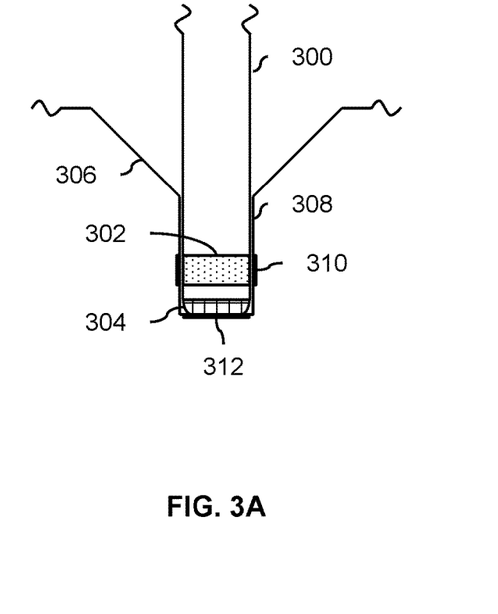
FIG. 3A is a diagram illustrating an embodiment of a vertically-oriented male charging port attached to an eVTOL vehicle inserted into a female charging port of a charger.

FIG. 3A is a diagram illustrating an embodiment of a vertically-oriented male charging port attached to an eVTOL vehicle inserted into a female charging port of a charger. In this example, a vertically-oriented male charging port (300) is part of an eVTOL vehicle and is associated with and/or used for charging. For example, in FIG. 1, the male charging port is retractable port (110) that is retracted into the body of the fuselage during normal operation (e.g., when flying a passenger from a pickup location to a drop off location, when flying to a next pickup location, etc.). In the example of FIG. 2, the male charging port is either the bottom portion of a vertical mast which is always extended or exposed (e.g., 210a) or the retracted part (e.g., retracted into the seatback compartment 212 which is also used to store the battery 214) which is extended when it is time to charge the battery. For example, depending upon the application, a retractable part may prevent damage to electrical components, but keeping the male charging port exposed all of the time is more attractive in some applications due to its simpler design.

In this example, the vertically-oriented male charging port (300) includes two electrical contacts for charging: a circular band (302) that wraps around the vertically-oriented male charging port and the tip or distal end (304) of the vertically-oriented male charging port. Those electrical contacts are the positive and negative contacts for charging or vice versa.

In this example, the female charging port of the charger includes an upper, conical section (306) that guides or otherwise funnels the male charging port into the female charging port as the eVTOL vehicle lands vertically (not shown) on top of the charger as well as a lower, cylindrical section (308) that forms a female charging port. The female charging port (308) of the charger includes electrical contacts at heights and/or positions that align with the electrical contacts on the eVTOL vehicle. For example, the charger has a cylindrically shaped electrical contact (310) on the interior surface of the cylindrical section that is aligned with circular band (302) of the male charging port. Similarly, the bottom interior surface of the female charging port (308) of the charger has an electrical contact (312) aligned with the electrical contact (304) at the tip of the male charging port. When the male charging port is fully inserted into the charger, the electrical contacts on the eVTOL side and the charger side are in contact with each other so that the battery in the eVTOL vehicle can be charged from the charger. It is noted that this figure is merely exemplary and in some other embodiments the electrical contacts are located in other locations.

It is noted that the male and female charging ports and electrical contacts are merely exemplary and are not intended to be limiting. In some embodiments, the ports and/or electrical contacts include pins, plugs, etc. In some embodiments, the charger includes features and/or components to ensure a good physical fit and/or electrical connection between the charger and the eVTOL vehicle. For example, the electrical contact (310) on the interior sidewall of the charger may be spring-loaded so that the spring can push the charger-side electrical contact(s) against the electrical contact(s) of the male charging port.

Figure 3B:
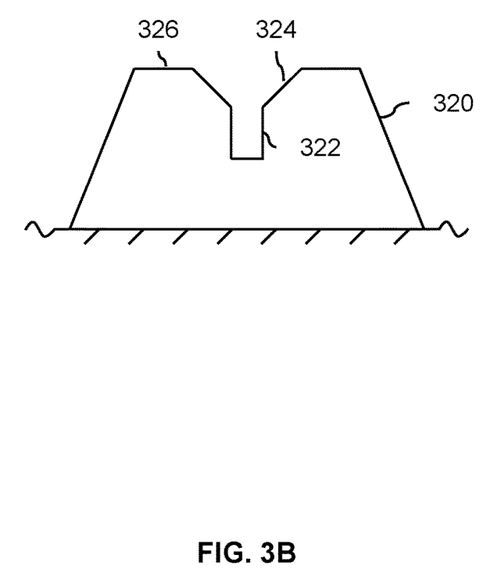
FIG. 3B is a diagram illustrating an embodiment of an above-ground charger.

FIG. 3B is a diagram illustrating an embodiment of an above-ground charger. In this example, the charger (320) is an above-ground device, for example that may be moved if desired (e.g., using a forklift if needed). As in the previous example, the charger includes a lower, cylindrical section (322) as well as an upper, conical section (324) to help guide the male charging port of the eVTOL vehicle into the female charging port. In this example, the charger also includes a flat and/or horizontal top surface (326), for example if the eVTOL vehicle makes contact with the ground at multiple points and/or requires support during charging. For example, the exemplary vehicle shown in FIG. 1 includes a fuselage and the fuselage would rest on and be supported by the flat surface (326) of the charger.

As will be described in more detail below, in some embodiments, multiple chargers are deployed in a secured area where eVTOL vehicles can autonomously land and charge in safe and secured areas without requiring human supervision. By making the chargers above-ground and moveable devices, the chargers may be easily rearranged within the secured area and/or the secured charging area may be expanded with more chargers if desired.

Figure 3C:
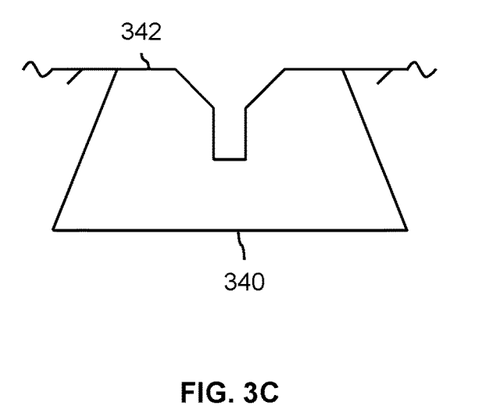
FIG. 3C is a diagram illustrating an embodiment of a below-ground charger.

FIG. 3C is a diagram illustrating an embodiment of a below-ground charger. In this example, the charger (340) is buried in the ground with the top surface (342) of the charger level with the ground. For example, this may be desirable in some applications because then the eVTOL vehicles can land anywhere in the vicinity of the chargers and will not be damaged by the chargers. It may also be safer and/or easier for any technicians to navigate the area if the charger(s) are buried below ground.

These charger examples are described more generally and/or formally in the flowchart below.

Figure 4:
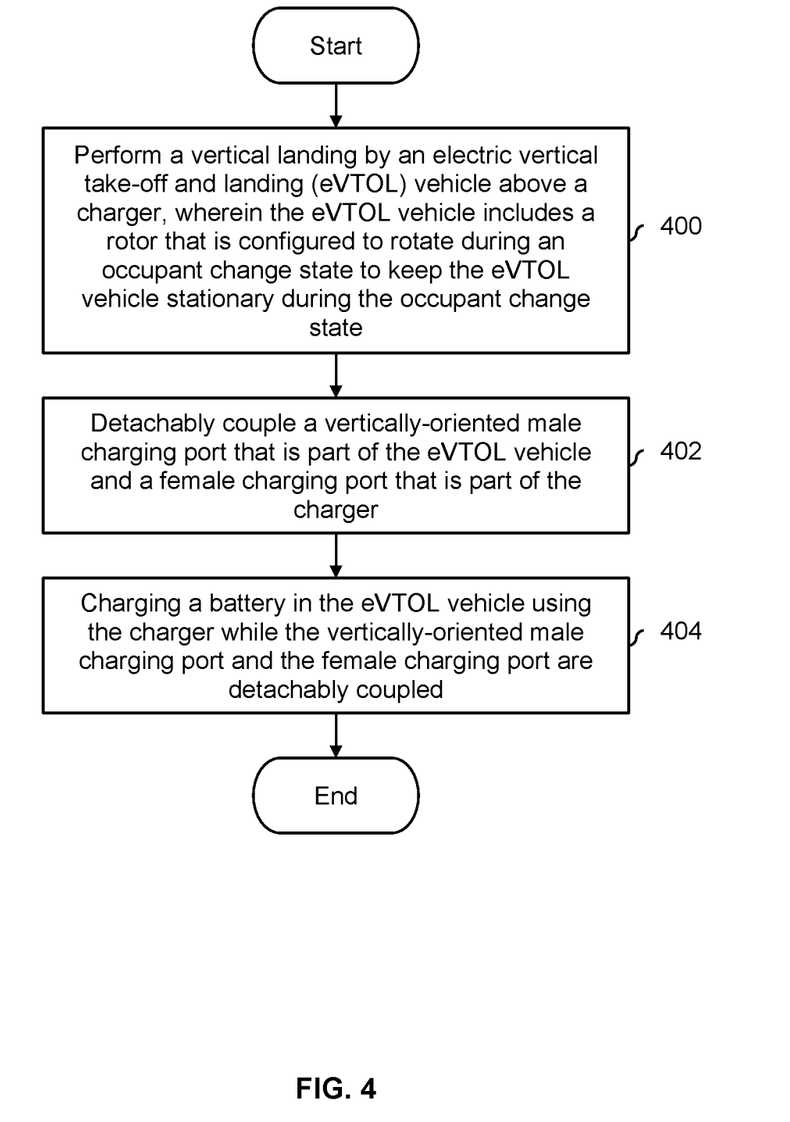
FIG. 4 is a flowchart illustrating an embodiment of a process to charge an eVTOL vehicle.

FIG. 4 is a flowchart illustrating an embodiment of a process to charge an eVTOL vehicle. In some embodiments, the eVTOL vehicle is unoccupied and this charging process is performed autonomously and/or without the aid of a human technician.

At 400, a vertical landing is performed by an electric vertical take-off and landing (eVTOL) vehicle above a charger, wherein the eVTOL vehicle includes a rotor that is configured to rotate during an occupant change state to keep the eVTOL vehicle stationary during the occupant change state. As used herein, occupant change state refers to a state or period associated with an occupant boarding the vehicle or disembarking from the vehicle. As described above, this may keep the vehicle from moving or tipping over as an occupant boards or disembarks the vehicle. For example, the vehicles shown in FIG. 1 or FIG. 2 may require charging and in response would fly (e.g., autonomously) to a charger and then land vertically (e.g., and autonomously) on the charger.

In some embodiments, an eVTOL vehicle lands autonomously on a charger. To assist with landing and/or orienting the eVTOL vehicle properly (if needed), in some embodiments, the charger (or the ground in the vicinity of a charger) contains aids to help the eVTOL vehicle land vertically on top of the charger. This may include visual aids that computer vision sensors on the eVTOL vehicle use to detect or otherwise identify the (appropriate) charger and land the vehicle properly on top of the charger. In some embodiments, there are multiple chargers in a charging area and there are (e.g., visual) aides that help an eVTOL vehicle autonomously identify the appropriate or assigned charger to land on.

In some embodiments, even though the rotors of the eVTOL vehicle are kept on during occupant boarding and/or disembarking, the rotors are turned off once the eVTOL vehicle has landed on the charger. For example, the depth of the exemplary female charging port (308) may be sufficiently deep to prevent the vehicle from moving, even in the presence of wind and/or signal noise. This may be desirable because it conserves energy while the eVTOL vehicle is detachably coupled to the charger.

At 402, a vertically-oriented male charging port that is part of the eVTOL vehicle and a female charging port that is part of the charger are detachably coupled. See, for example, FIG. 3A which shows an example of a vertically-oriented male charging port (300) detachably coupled to the female charging port (308) of the charger. In some embodiments, the male charging port on the eVTOL side is retractable and step 402 includes extending the male charging port into the charger. In some embodiments, the eVTOL vehicle may do this autonomously once it has determined that it has properly landed the eVTOL vehicle on the charger.

At 404, a battery in the eVTOL vehicle is charged using the charger while the vertically-oriented male charging port and the female charging port are detachably coupled. As described above, the eVTOL vehicle may be part of a fleet of autonomous vehicles and the charging process described in this example permits such vehicles to be charged autonomously which permits faster charging turnaround times than could be done with technicians (e.g., if multiple vehicles arrive simultaneously for charging they can begin charging immediately and simultaneously without waiting for a technician to intervene).

After charging has completed, the charger and eVTOL vehicle decouple from each other (e.g., by retracting the male charging port if needed and having the eVTOL vehicle takeoff vertically) and the eVTOL vehicle takes off vertically.

In some embodiments, the exemplary charging process shown here is initiated when the battery level in an eVTOL vehicle drops below a threshold level. In some embodiments, the exemplary charging process is initiated when some vehicle allocator determines that the number of available vehicles is more than sufficient to support the current demand for trips (e.g., opportunistically charge when there is high supply and/or low demand). In some embodiments, vehicles are charged according to a schedule (e.g., so that only a certain number of vehicles are unavailable at any given time).

In some embodiments there is a fenced-off area with chargers which eVTOL vehicles can fly to in order to charge. As will be described in more detail below, multiple vehicles may simultaneously use the area and the area is autonomously controlled by some controller.

Figure 5:
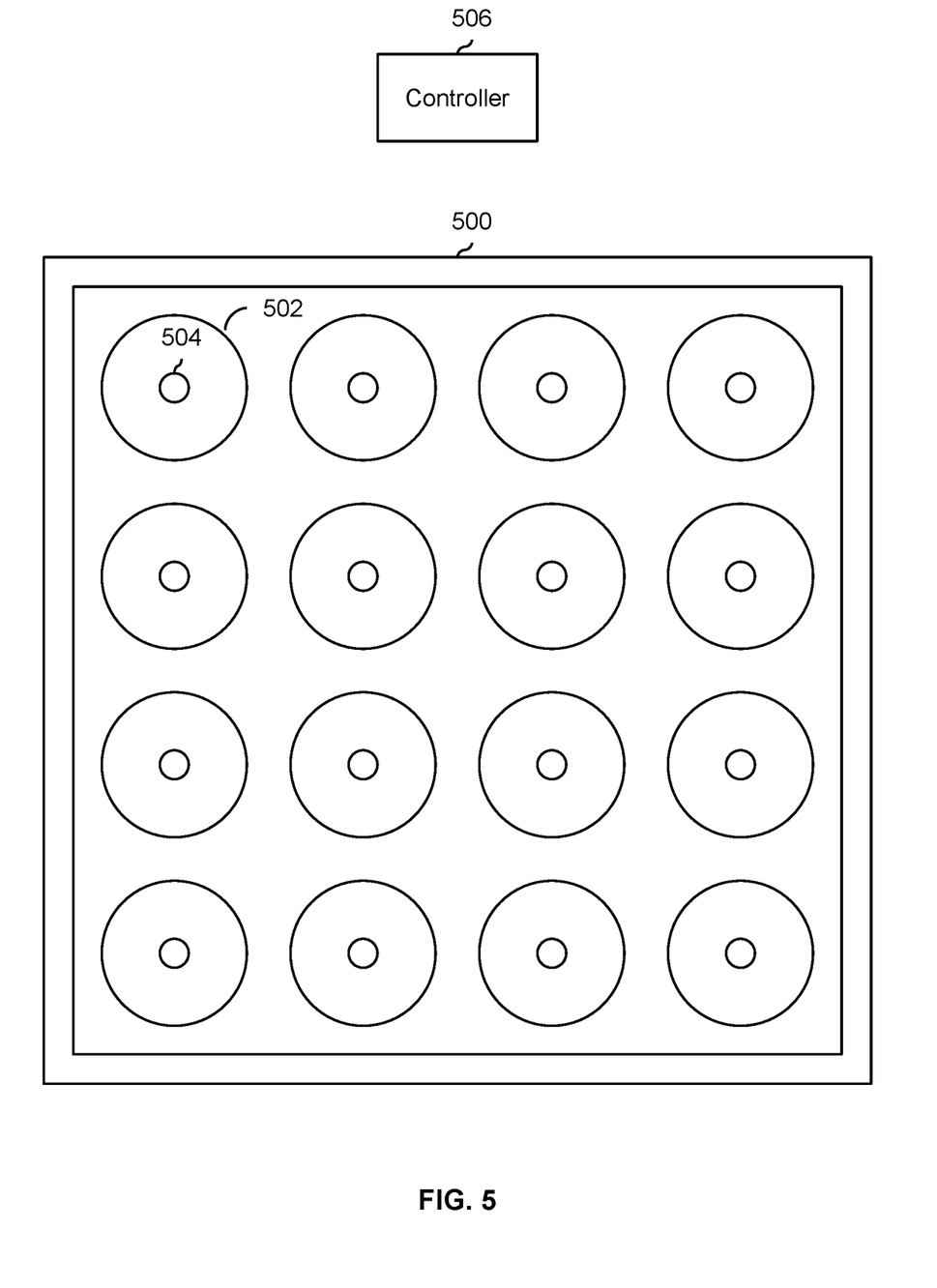
FIG. 5 is a diagram illustrating an embodiment of a fenced off area for eVTOL vehicles to charge in which is managed by a controller.

FIG. 5 is a diagram illustrating an embodiment of a fenced off area for eVTOL vehicles to charge in which is managed by a controller. In this example, an area that is surrounded by a fence (500) is used by eVTOL vehicles to fly into and charge. In this example, there are 16 chargers (502) for 16 vehicles. For example, the fence may keep out animals and/or people and prevent injuries when the vehicles are charging. For context, the female charging port (504) of the charger is shown into which the vertically-oriented male charging port of the vehicle (not shown) is to fit into. The chargers are placed with sufficient room so that neighboring vehicles do not collide as they land, takeoff, or charge on their respective charger.

In this example, to help avoid collisions during takeoff and landing, the fenced off area is managed by an autonomous controller (506). For example, the controller keeps track of which spaces are occupied by a vehicle, if any. As described above, the exemplary eVTOL vehicles are unoccupied and are in an autonomous flight mode prior to charging. As a vehicle approaches the fenced off area, a controller in the vehicle contacts or otherwise communicates with the (secured area) controller to request a space in the secured area. The controller then assigns the vehicle to an unoccupied space (e.g., following some sequence of assigned spots or spaces that keeps vehicles at maximal distances from each other) and the vehicle (autonomously) lands in the assigned spot. At the end of charging, the vehicle may communicate with the controller to indicate the vehicle's departure so that the controller knows the space is now unoccupied. In some embodiments, the controller also acts like a flight controller (e.g., only permitting one vehicle to be in air at a given time).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electric vertical take-off and landing (eVTOL) vehicle, comprising:
    a controller that is configured to perform a vertical landing by the eVTOL vehicle above a charger;
    a rotor that is configured to rotate during occupant boarding to keep the eVTOL vehicle stationary during occupant boarding; and
    a vertically-oriented male charging port that is:
        provided on an underside of the eVTOL vehicle, and
        configured to charge a battery in the eVTOL vehicle including by detachably coupling the vertically-oriented male charging port that is part of the eVTOL vehicle and a female charging port that is part of the charger.

2. The eVTOL vehicle recited in claim 1, wherein the vertically-oriented male charging port is retractable and detachably coupling the vertically-oriented male charging port and the female charging port includes extending the vertically-oriented male charging port.

3. The eVTOL vehicle recited in claim 1, wherein:
    the eVTOL vehicle further includes a seatback compartment which includes the battery; and
    the vertically-oriented male charging port is retractable and detachably coupling the vertically-oriented male charging port and the female charging port includes extending the vertically-oriented male charging port outward from the seatback compartment.

4. The eVTOL vehicle recited in claim 1, wherein:
    the eVTOL vehicle is an ultralight, open air vehicle that further includes a seatback compartment which includes the battery; and the vertically-oriented male charging port is retractable and detachably coupling the vertically-oriented male charging port and the female charging port includes extending the vertically-oriented male charging port outward from the seatback compartment.

5. The eVTOL vehicle recited in claim 1, wherein:
the charger is located in a secured area that includes a plurality of chargers; and
the controller is further configured to communicate with a secured area controller to receive an assignment of the charger from the plurality of chargers in the secured area for the eVTOL vehicle to perform the vertical landing above.

6. A method, comprising:
performing a vertical landing by an electric vertical take-off and landing (eVTOL) vehicle above a charger, wherein the eVTOL vehicle includes a rotor that is configured to rotate during an occupant change state to keep the eVTOL vehicle stationary during the occupant change state;
detachably coupling a vertically-oriented male charging port that is part of the eVTOL vehicle and a female charging port that is part of the charger, wherein the vertically-oriented male charging port is provided on an underside of the eVTOL vehicle; and
charging a battery in the eVTOL vehicle using the charger while the vertically-oriented male charging port and the female charging port are detachably coupled.

7. The method recited in claim 6, wherein the vertically-oriented male charging port is retractable and detachably coupling the vertically-oriented male charging port and the female charging port includes extending the vertically-oriented male charging port.

8. The method recited in claim 6, wherein:
the eVTOL vehicle further includes a seatback compartment which includes the battery; and
the vertically-oriented male charging port is retractable and detachably coupling the vertically-oriented male charging port and the female charging port includes extending the vertically-oriented male charging port outward from the seatback compartment.

9. The method recited in claim 6, wherein:
the eVTOL vehicle is an ultralight, open air vehicle that further includes a seatback compartment which includes the battery; and
the vertically-oriented male charging port is retractable and detachably coupling the vertically-oriented male charging port and the female charging port includes extending the vertically-oriented male charging port outward from the seatback compartment.

10. The method recited in claim 6, wherein:
the charger is located in a secured area that includes a plurality of chargers; and
the method further includes communicating with a secured area controller to receive an assignment of the charger from the plurality of chargers in the secured area for the eVTOL vehicle to perform the vertical landing above.

11. A computer program product, the computer program product being embodied in non-transitory computer readable storage medium and comprising computer instructions for:

performing a vertical landing by an electric vertical take-off and landing (eVTOL) vehicle above a charger, wherein the eVTOL vehicle includes a rotor that is configured to rotate during an occupant change state to keep the eVTOL vehicle stationary during the occupant change state;
detachably coupling a vertically-oriented male charging port that is part of the eVTOL vehicle and a female charging port that is part of the charger, wherein the vertically-oriented male charging port is provided on an underside of the eVTOL vehicle; and
charging a battery in the eVTOL vehicle using the charger while the vertically-oriented male charging port and the female charging port are detachably coupled.

12. The computer program product recited in claim 11, wherein the vertically-oriented male charging port is retractable and the computer instructions for detachably coupling the vertically-oriented male charging port and the female charging port include computer instructions for extending the vertically-oriented male charging port.

13. The computer program product recited in claim 11, wherein:
the eVTOL vehicle further includes a seatback compartment which includes the battery; and
the vertically-oriented male charging port is retractable and the computer instructions for detachably coupling the vertically-oriented male charging port and the female charging port include computer instructions for extending the vertically-oriented male charging port outward from the seatback compartment.

14. The computer program product recited in claim 11, wherein:
the eVTOL vehicle is an ultralight, open air vehicle that further includes a seatback compartment which includes the battery; and
the vertically-oriented male charging port is retractable and the computer instructions for detachably coupling the vertically-oriented male charging port and the female charging port include computer instructions for extending the vertically-oriented male charging port outward from the seatback compartment.

15. The computer program product recited in claim 11, wherein:
the charger is located in a secured area that includes a plurality of chargers;
the computer program product further includes computer instructions for communicating with a secured area controller to receive an assignment of the charger from the plurality of chargers in the secured area for the eVTOL vehicle to perform the vertical landing above.

16. The eVTOL vehicle recited in claim 1, further comprising the battery.

17. The eVTOL vehicle recited in claim 1, further comprising a vertical spar, wherein the rotor is mounted on the vertical spar to provide separation between the rotor and an occupant of the eVTOL vehicle.

18. The eVTOL vehicle recited in claim 17, wherein the vertically-oriented male charging port is provided on a bottom portion of the vertical spar.

* * * * *